United States Patent Office 3,030,184
Patented Apr. 17, 1962

3,030,184
METHOD FOR PRODUCTION OF MAGNESIUM HYDRIDE
John P. Faust, Kenmore, Charles E. Fogle, Niagara Falls, and Theodore L. Heying, Tonawanda, N.Y., assignors to Olin Mathieson Chemical Corporation
No Drawing. Filed Aug. 21, 1958, Ser. No. 756,298
8 Claims. (Cl. 23—204)

This invention relates to a method for the production of magnesium hydride by reacting magnesium metal and molecular hydrogen.

It is old in the art to prepare magnesium hydride by reacting magnesium in elemental form together with hydrogen gas. According to British Patent 777,095, the reaction has been carried out by reacting a mixture of magnesium iodide and magnesium with hydrogen, this particular procedure being subject to the disadvantage, however, that the magnesium hydride thus prepared is contaminated by a large amount of magnesium iodide. The British patent proposes a process in which the magnesium and hydrogen are reacted at temperatures of 400–500° C. at hydrogen pressures of more than 30 atmospheres, preferably several hundred atmospheres, a small amount of mercury or mercury compound being admixed with the magnesium, if desired.

In accordance with the present invention, there is provided a method for the manufacture of magnesium hydride from magnesium metal and molecular hydrogen which possesses the advantage that it operates effectively under relatively mild conditions of temperature and pressure. The process involves the use as a catalyst of a compound of the class $RXX'$, wherein R is an aliphatic hydrocarbon radical containing from 1 to 3 carbon atoms, X is chlorine, bromine or iodine, and $X'$ is chlorine, bromine, iodine or hydrogen. Mixtures of such compounds can also be utilized as a catalyst. Among the compounds falling within the scope of the formula $RXX'$ which are useful catalysts are methyl iodide, allyl iodide, propargyl bromide, di-iodomethane and the like. The amount of catalyst introduced into the reaction mixture can be varied widely, generally being within the range from about 0.5 to 15 moles per 100 moles of magnesium, although somewhat smaller and somewhat larger amounts could also be used. The reaction temperature employed will generally be within the range from about 150° C. to 400° C. and the reaction pressure used will generally be within the range from 25 p.s.i.g. to 500 p.s.i.g., although here again conditions of temperature and pressure both below and above these ranges are used.

The following examples illustrate the invention. In the examples, the term "moles" signifies gram moles.

*Example I*

In this experiment, 330 millimoles of 325-mesh magnesium powder was placed in a porcelain ball mill together with 2.48 millimoles of di-iodomethane under a nitrogen atmosphere and the mixture was then ground for approximately 16 hours. The mixture was then transferred to an autoclave which had an inside diameter of approximately 1½ inches and an outside diameter of 3 inches, was approximately 11 inches long and had a volume of 250 ml., a nitrogen atmosphere still being present. The nitrogen atmosphere was then removed by pressuring with hydrogen gas to a pressure of 150 p.s.i.g. The temperature of the reaction mixture was then raised to 350–360° C. and held within that range until no further pressure drop was observed. This required a heating period of approximately 6 hours. Analysis showed that 92.5 percent of the magnesium metal had been converted to magnesium hydride.

*Example II*

Using the procedure described in Example I, 247 millimoles of magnesium powder was first ball milled with 1.65 millimoles of methyl iodide for approximately 16 hours under a nitrogen atmosphere. The mixture was then transferred to the reactor and then hydrogenated at 381–389° C. under a hydrogen pressure of 240–300 p.s.i.g. until the pressure become substantially constant. In this example, 89.5 percent by weight of the magnesium metal was converted to magnesium hydride.

*Example III*

Using the procedure described in Example I, 248 millimoles of magnesium powder was first ball milled with 2.20 millimoles of allyl iodide for approximately 16 hours under a nitrogen atmosphere. The mixture was then transferred to the reactor and then hydrogenated at 338–358° C. under a hydrogen pressure of approximately 160 p.s.i.g. until the pressure became substantially constant. In this example, 82.7 percent by weight of the magnesium metal was converted to magnesium hydride.

*Example IV*

Using the procedure described in Example I, 250 millimoles of magnesium powder was first ball milled with 12.9 millimoles of propargyl bromide for approximately 16 hours under a nitrogen atmosphere. The mixture was then transferred to the reactor and then hydrogenated at 374–389° C. under a hydrogen pressure of approximately 190–240 p.s.i.g. until the pressure became substantially constant. In this example 84.0 percent by weight of the magnesium metal was converted to magnesium hydride.

*Example V*

Using the procedure described in Example I, 414 millimoles of magnesium powder was first ball milled with 33 millimoles of allyl iodide for approximately 16 hours under a nitrogen atmosphere. The mixture was then transferred to the reactor and then hydrogenated at 220–300° C. under a hydrogen pressure of approximately 30–100 p.s.i.g. until the pressure became substantially constant. In this example 94.5 percent by weight of the magnesium metal was converted to magnesium hydride.

*Example VI*

Using the procedure described in Example I, 414 millimoles of magnesium powder was first ball milled with 6.1 millimoles of allyl chloride for approximately 16 hours under a nitrogen atmosphere. The mixture was then transferred to the reactor and then hydrogenated at 170–230° C. under a pressure of approximately 2 to 5 atmospheres until the pressure became substantially constant. In this example 78.5 percent by weight of the magnesium metal was converted to magnesium hydride.

*Example VII*

In this example, 10.1075 grams (0.416 mole) of 325-mesh magnesium powder was placed in a porcelain ball mill with 3.696 grams (2 ml.) of allyl iodide and ground for approximately 16 hours. The light gray magnesium was converted by this treatment to a charcoal colored powder. This material was transferred to the autoclave described in Example I under a nitrogen atmosphere. Then 0.152 gram of proparagyl bromide and 0.0419 gram of iodine crystals were added. The nitrogen atmosphere was removed by pressuring with hydrogen and the pressure was adjusted to 100 p.s.i.g. An initial pressure drop occurred at 175° C. The hydrogen pressure was subsequently allowed to fall until no further pressure decrease was noted. Then the system was repressured to 75 p.s.i.g. The temperature during the heating period of six hours was 180°–290° C. and the pressure was 1.7 to 5.1 atmospheres. The product obtained was a light gray powder with a brownish cast. A chemical analysis of the product indicated that the material was 73.7 percent magnesium and had an active hydrogen content of 0.1105 gram of hydrogen per gram of sample. This yield corresponds to a 99.6 percent conversion of the magnesium to magnesium hydride.

*Example VIII*

In this experiment, 425 millimoles of 325-mesh magnesium powder was placed in a porcelain ball mill with 22.0 millimoles of allyl iodide and gorund for approximately 16 hours. The mixture was transferred to the autoclave described in Example I under a nitrogen atmosphere. Then 1.28 millimoles of propargyl bromide and 0.16 millimole of iodine crystals were added. The nitrogen atmosphere was removed by pressuring with hydrogen. The magnesium metal and hydrogen were then reacted at a temperature of 270–360° C. and at a pressure of 200–250 p.s.i.g. until the absorption of hydrogen by the reaction mixture had substantially ceased. By this means 91.8 percent of the magnesium metal was converted to magnesium hydride.

*Example IX*

In this experiment 331 millimoles of 325-mesh magnesium powder was placed in a porcelain ball mill with 1.62 millimoles of allyl iodide and ground for approximately 16 hours. The mixture was transferred to the autoclave described in Example I under a nitrogen atmosphere. Then 0.16 millimole of iodine was added. The nitrogen atmosphere was removed by pressuring with hydrogen. The magnesium metal and hydrogen were then reacted at a temperature of 292–350° C. and at a pressure of 85–150 p.s.i.g. until the absorption of hydrogen by the reaction mixture had substantially ceased. By this means 90.4 percent of the magnesium metal was converted to magnesium hydride.

It is claimed:
1. In the production of magnesium hydride by reacting magnesium metal and molecular hydrogen, the step of introducing into the reaction mixture consisting essentially of magnesium metal and hydrogen a catalytic amount of a compound of the class RXX' wherein R is an aliphatic hydrocarbon radical containing from 1 to 3 carbon atoms, X is selected from the group consisting of chlorine, bromine, and iodine and X' is selected from the group consisting of chlorine, bromine, iodine and hydrogen.

2. In the production of magnesium hydride by reacting magnesium metal and molecular hydrogen, the step of introducing into the reaction mixture consisting essentially of magnesium metal and hydrogen from 0.5 to 15 moles per 100 moles of magnesium of a compound of the class RXX' wherein R is an aliphatic hydrocarbon radical containing from 1 to 3 carbon atoms, X is selected from the group consisting of chlorine, bromine and iodine, and X' is selected from the group consisting of chlorine, bromine, iodine and hydrogen.

3. The method of claim 2 wherein RXX' is di-iodomethane.

4. The method of claim 2 wherein RXX' is methyl iodide.

5. The method of claim 2 wherein RXX' is allyl iodide.

6. The method of claim 2 wherein RXX' is propargyl bromide.

7. The method of claim 2 wherein RXX' is allyl chloride.

8. A process for the production of magnesium hydride which includes reacting reactants consisting essentially of magnesium metal and molecular hydrogen at a temperature of from 150° C. to 400° C. and a pressure of from 25 p.s.i.g. to 500 p.s.i.g. while the reactants are in admixture with from 0.5 to 15 moles per 100 moles of magnesium metal of a compound of the class RXX' wherein R is an aliphatic hydrocarbon radical containing from 1 to 3 carbon atoms, X is selected from the group consisting of chlorine, bromine and iodine, and X' is selected from the group consisting of chlorine, bromine, iodine and hydrogen.

References Cited in the file of this patent

UNITED STATES PATENTS

| 1,898,966 | Spilker | Feb. 21, 1933 |

FOREIGN PATENTS

| 777,095 | Great Britain | June 19, 1957 |
| 792,017 | Great Britain | Mar. 19, 1958 |
| 1,133,993 | France | Nov. 26, 1956 |
| 862,004 | Germany | Jan. 8, 1953 |

OTHER REFERENCES

Richter: "Textbook of Organic Chemistry," 2nd ed., 1943, page 32.